(12) United States Patent
Schaerlund et al.

(10) Patent No.: US 7,267,706 B2
(45) Date of Patent: Sep. 11, 2007

(54) AIR FILTER

(75) Inventors: Jukka Schaerlund, Offenbach (DE); Reinhard Oelpke, Harthausen (DE)

(73) Assignee: Mann & Hummel GmbH, Ludwigsburg (DE)

( * ) Notice: Subject to any disclaimer, the term of this patent is extended or adjusted under 35 U.S.C. 154(b) by 395 days.

(21) Appl. No.: 10/797,601

(22) Filed: Mar. 11, 2004

(65) Prior Publication Data

US 2004/0261383 A1 Dec. 30, 2004

(30) Foreign Application Priority Data

Mar. 14, 2003 (DE) ................. 103 11 640

(51) Int. Cl.
*B01D 39/00* (2006.01)
(52) U.S. Cl. .................. 55/492; 55/498; 55/510; 55/502
(58) Field of Classification Search .............. 55/481, 55/482, 492, 498, 502, 510; 123/198 E
See application file for complete search history.

(56) References Cited

U.S. PATENT DOCUMENTS 4,720,292 A 1/1988 Engel et al.
5,211,846 A * 5/1993 Kott et al. .................. 210/232

FOREIGN PATENT DOCUMENTS

DE 79 02 819 6/1979

* cited by examiner

*Primary Examiner*—Robert Hopkins
(74) *Attorney, Agent, or Firm*—Crowell & Moring LLP

(57) ABSTRACT

An air filter, in particular for purifying combustion air for an internal combustion engine, composed of an essentially metal-free filter insert which forms a hollow cylinder having end disks arranged on the axial end faces of the filter medium of the filter insert, one end disk forming a closed end of the filter element and having a handle element extending axially away from the filter element, and the other end disk being constructed as a hollow cylinder having a concentric, elastic, radially-acting gasket.

8 Claims, 5 Drawing Sheets

AIR FILTER

BACKGROUND OF THE INVENTION

This invention relates to an air filter, and particularly to an air filter for the intake air of an internal combustion engine.

U.S. Pat. No. 4,720,292 discloses an air filter having a housing provided with an axial outlet opening and an essentially open second end which is closable by a removable cover. An air inlet opening is provided on the circumference of the housing. The housing accommodates an essentially cylindrical filter element having an inner support tube and a filter having an outer support tube, with the inner filter element being arranged coaxially in the housing. The filter element is sealed on the housing by an annular end disk which has an essentially cylindrical surface directed radially inward and which is pushed over an inner section of the outlet part. It is known that filter inserts in air filters are replaced after a certain operating time. Depending on the dust load, the service life of a filter may vary from a few days—e.g., construction machines—up to several months.

One disadvantage of the known state of the art can be seen in the fact that a relatively large housing is needed for the filter insert and takes up an unnecessarily large amount of space in the clean air area. The known filter systems for internal combustion engines are usually installed in the vicinity of the engine, usually in the engine compartment. However, it is becoming increasingly difficult to situate the air filter system in this area because the available installation space has been dwindling. Space is very limited in commercial vehicles in particular, especially in tractors, due to the extra functions provided in the engine compartment, e.g., hydraulic and pneumatic elements. Access to these systems is hindered by an air filter system situated in the engine space near the engine. In addition, placing the air filter in the engine compartment puts the intake in a dirty area of the vehicle, so that the air filter is exposed to such an elevated particulate burden that the service life of the filter is greatly reduced.

In this regard, German Patent DE 79 02 819 proposes to provide an intake air purifying element as an external element mounted on the body of a truck, whereby the element includes a prefilter and water separator, a cyclone and an air filter. However, this embodiment is dependent on the individual construction of the bodies of various trucks and is thus greatly limited with regard to freedom of placement, and in many cases it cannot be used at all in agricultural machines, for example, with their special bodies.

SUMMARY OF THE INVENTION

It is an object of the invention to provide an improved air filter, and particularly an air filter suitable for filtering the intake air of an internal combustion engine.

Another object of the invention is to provide an air filter which is not subject to the disadvantages described above.

A further object of the invention is to provide an air filter element for a universally usable and installable air filter system.

An additional object of the invention is to provide an air filter which is easy to install and permits a great variability in placement.

It is also an object of the invention to provide an air filter element which achieves a very good separation efficiency.

Yet another object of the invention is to provide an air filter element which can be readily adapted to a specific air filter system.

These and other objects are achieved in accordance with the present invention by providing an air filter comprising an essentially metal-free filter insert with a filter medium which forms a hollow cylinder, and end disks arranged on the axial end faces of the filter medium of the filter insert, wherein one end disk forms a closed end of the filter element and has a handle element extending axially away from the filter element, and the other end disk is constructed as a hollow cylinder and comprises a concentric, radially-acting, resilient gasket.

In accordance with a further aspect of the invention, the objects are also achieved by providing a secondary filter element for an air filter, said secondary filter element comprising an essentially metal-free filter insert with a filter medium which forms a hollow cylinder and end disks arranged on axial end faces of the cylindrical filter medium, wherein the one end disk forms a closed end of the filter element and the other end disk has a hollow cylindrical construction and carries a concentric handle element extending axially away from the filter element and a concentric, radially-acting, resilient gasket.

The air filter of the invention is particularly suitable for cleaning the combustion air of internal combustion engines and comprises an essentially metal-free filter insert forming a hollow cylinder. End disks are provided on the end faces of the filter medium of the filter insert, with one of the end disks forming a closed end of the filter element and having a handle element extending axially away from the filter element and the other end disk having a hollow cylindrical construction with a concentric, radially-acting, resilient gasket. The handle element does not extend radially beyond the projected area of the filter medium and preferably has an M-shaped cross section. However, other shapes are also conceivable, but simple handling should be the primary concern.

According to one embodiment of this invention, the filter medium is a zig-zag folded or pleated filter paper, and the end disks are made of a thermoplastic synthetic resin material. The end disks are inseparably bonded together with the filter medium by welding or an adhesive. Because the end disks are made of a thermoplastic synthetic resin material, the handle element, which is integrally connected with the one end disk, has the required strength to enable the air filter to be handled via the handle element. The second end disk is preferably also made of a thermoplastic synthetic resin material, but a soft elastic synthetic resin material, such as a thermoplastic elastomer, can also be used here. In this case, the concentric, radially-acting gasket may be constructed in one piece with the end disk.

The filter insert advantageously has a concentric supporting body adjacent the inside wall or the outside wall of the filter medium. To avoid a loss of stability of the filter medium at high volume flows, the filter medium is either surrounded by the concentric supporting body or it lies against an internal concentric supporting body. The position of the supporting body here is predetermined first by the direction of flow and second by requirements pertaining to the installation space. Preferably, the supporting body is situated in the interior of the filter medium and is made of a thermoplastic synthetic resin material (i.e., plastic).

One advantageous embodiment of the invention is characterized in that the hollow cylindrical end disk has a hollow cylindrical concentric collar which is connected by reinforcing ribs to the end disk. In this case the collar has a diameter similar to the open inside diameter of the filter medium and serves several purposes. On the one hand, it performs sealing functions correspondingly via the collar with the filter housing, and on the other hand, the collar serves to fix the axial position of the air filter when it is installed in the housing. In order to be able to use the entire filter medium surface area, the collar must be designed with an axial spacing relative to the filter medium. In addition, to promote the stability of the collar, reinforcing ribs are provided between the collar and the end disk to inhibit deformation and/or widening of the collar.

In one preferred embodiment of the invention, the hollow cylindrical collar has an outer peripheral groove which accommodates a gasket in the form of a radially outwardly protruding lip. The gasket may be molded onto the collar using a two-component molding process. The gasket may be an O-ring placed in the base of the groove or it may be some other type or form of seal known in the art. The sealing lip in this case preferably has a T-shaped cross section, with the legs of the T protruding outward and lie against the wall which is to be sealed like the lip on a windshield wiper. Since the sealing lip in this case undergoes a certain spatial deformation, this virtually rules out the possibility of lifting of the sealing lip around the circumference, which would lead to leakage.

In another advantageous embodiment of the invention, the filter insert is correspondingly connected in a sealed manner via the radial gasket to a circular connecting profile, whereby the connecting profile is preferably arranged in an air filter system to accommodate the air filter. In the installed state, the axial end of the collar is axially limited by a stop in the connecting profile. The seal is provided by the radial gasket corresponding to the connecting profile, and additionally, in the connection to the air filter, a secondary element can be connected to the filter insert forming a seal via the connecting profile. The connecting profile thus forms the interface for connecting the air filter and secondary element on the one hand and for determining the position and centering the filter elements in the housing on the other hand. The connection is established like that of a plug and socket system with the air filter being the socket, the secondary element being the plug and the connecting profile being a type of adapter.

The secondary element provided in this case comprises an essentially metal-free filter insert which forms a hollow cylinder, with end disks being arranged on the end faces of the filter element of the filter insert. The one end disk thereby forms a closed end of the filter element and the other end disk has a hollow cylindrical construction, whereby the hollow cylindrical end disk comprises a concentric handle element extending away from the filter element and a concentric, radially-acting, resilient gasket. For the corresponding effect of the secondary element and the air filter, the arrangement and design of the end disks in the case of the secondary element are different from those of the air filter. The one end disk here forms a simple sealing closure of the secondary filter element and the other end disk fulfils the handle and sealing functions.

According to one embodiment of the secondary element, the secondary element is connectable in a correspondingly sealed manner to the circular ring-shaped connecting profile via the radial gasket, whereby the annular handle element has a smaller outside diameter than the inside diameter of the axial end of the collar of the air filter, as described above, and engages therein, which results in centering of the filters relative to each other. In this case the grip element, on the one hand, assumes the function of a handle for handling the secondary filter element, and on the other hand, assumes the function of a centering guide to align the air filter concentrically with the secondary element.

The filter medium of the secondary element is advantageously a nonwoven filter web, and at least one end disk is preferably made of a thermoplastic synthetic resin material. Filter media of this type are well known in the art and need not be described in further detail here. The end disk which has the handle element and is provided for centered guiding of the air filter is preferably made of a thermoplastic synthetic resin material such as polyamide [nylon] or polypropylene.

One advantageous embodiment of the invention is characterized in that the handle element is in the form of an upright collar provided with perforations, whereby a groove is provided on the outer circumference of the collar to accommodate a gasket in the form of a radially outwardly protruding lip. As in the case of the air filter, the gasket here may again be designed in a wide variety of ways, but it is preferably also designed to have a T-shaped cross section with a sealing lip in the form of a windshield wiper lip protruding radially outward.

In this type of arrangement, the air filter and the secondary element may cooperate perfectly, the secondary element here assuming a type of security function because the vast majority of the foreign particles have already been filtered out by an optional prefilter and the air filter. In contrast to the arrangement used previously in the prior art, because in this arrangement the secondary filter element is sealed at the upstream end and the air flows through this filter arrangement from the outside to the inside, and through the secondary element from the inside to the outside, large particles and pieces may be captured in the secondary element without penetrating further into the intake tract of the internal combustion engine in the event the air filter fails or when changing the air filter. This function is especially important when changing filter elements because there is always the possibility of a screw or tool being dropped. The air filter element is thus gripped first by its handle to pull it out of the connecting profile and thus out of the housing, while the secondary element initially remains in position, closing off the intact tract from any parts or pieces that otherwise might fall into it. Thereafter, the secondary element can be pulled according to the replacement instructions by the handle of the secondary element from the connecting profile and thus from the housing, and then it can also be changed.

These and other features of preferred embodiments of the invention, in addition to being set forth in the claims, are also disclosed in the specification and/or the drawings, and the individual features each may be implemented in embodiments of the invention either alone or in the form of subcombinations of two or more features and can be applied to other fields of use and may constitute advantageous, separately protectable constructions for which protection is also claimed.

BRIEF DESCRIPTION OF THE DRAWINGS

The invention will be described in further detail hereinafter with reference to illustrative preferred embodiments shown in the accompanying drawing figures in which.

DETAILED DESCRIPTION OF PREFERRED EMBODIMENTS

Figure 1:
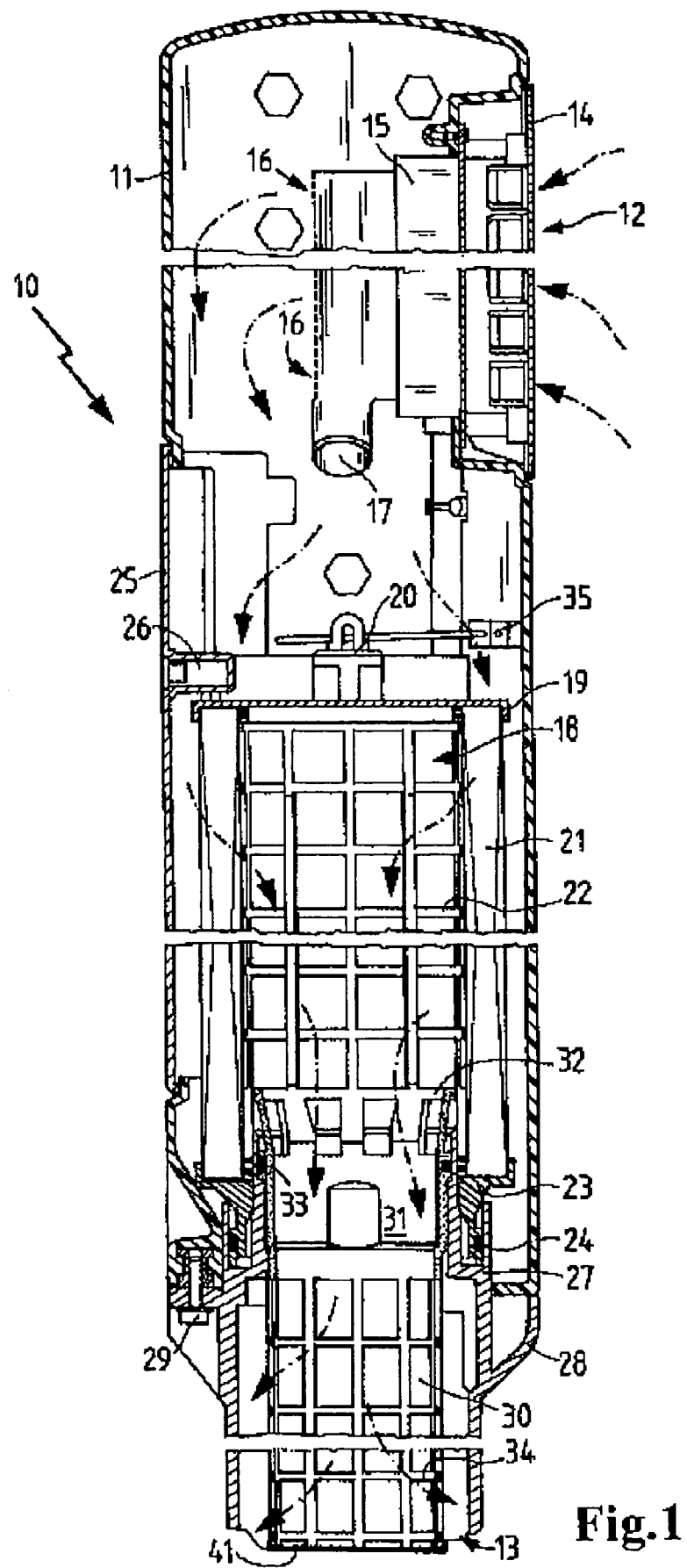
FIG. 1 is a sectional view through an air filter system according to the invention.

FIG. 1 shows the air filter 10 of the invention having a housing 11 which has an inlet 12 and an outlet 13. The outlet 13 is connected to the remaining course of the intake system of the internal combustion engine (not shown). The inlet 12 has an inlet cover 14, e.g., in the form of a mesh structure, and air flows directly into a cyclone section 15 as indictated by the arrows in the drawing. The cyclone section 15 has an air outlet 16 for the air which has passed through the cyclone section 15 and is now purified, as well as having a dust discharge opening 17. The remaining course of the discharge of dust downstream from the dust discharge opening 17 is described in greater detail in conjunction with FIG. 2 and is not discussed further here in FIG. 1.

Downstream from the air outlet 16, the air flows radially from the outside to the inside through the main filter. Main filter 18 has a first end disk 19, with an axially projecting handle element 20 formed integrally with the first end disk 19. A hollow cylindrical filter medium 21 is connected to the first end disk 19 and supported internally by a supporting tube 22. Filter medium 21 and supporting tube 22 are in turn connected to a second end disk 23 downward in the direction of flow. The second end disk 23 carries a radial gasket 24.

Proper installation of the main filter 18 in the correct position can be detected when locking a housing cover 25 because an axial stop element 26 on the housing cover 25 can only protrude radially into the housing above first end disk 19 if the filter element is installed in the proper position. The main filter element 18 is installed in the air filter 10 via a connecting profile 27 having a flange 28, which is in turn connected by a screw connection 29 to the housing 11, so that the filter element is centered and stopped axially by the connecting profile 27. The radial gasket 24 seals the main filter element 18 relative to the connecting profile 27. The remaining course of the flange 28 is connected to the intake system of the internal combustion engine (not shown).

Downstream from the main filter 18 there follows a secondary filter element 30 having a first end disk 31 from which a collar 32 extends axially toward the main filter element 18. End disk 31 also has a radial gasket 33. The secondary filter element 30 also has an internal supporting tube 34 and its lower end is sealed by a closed end disk 41. The radial gasket 33 of the secondary filter element 30 also forms a tight connection with the connecting profile 27. After the secondary element 30 and main filter element 18 are installed, they can be locked in position in the housing 11 by a clip-on connection 35.

Figure 2:
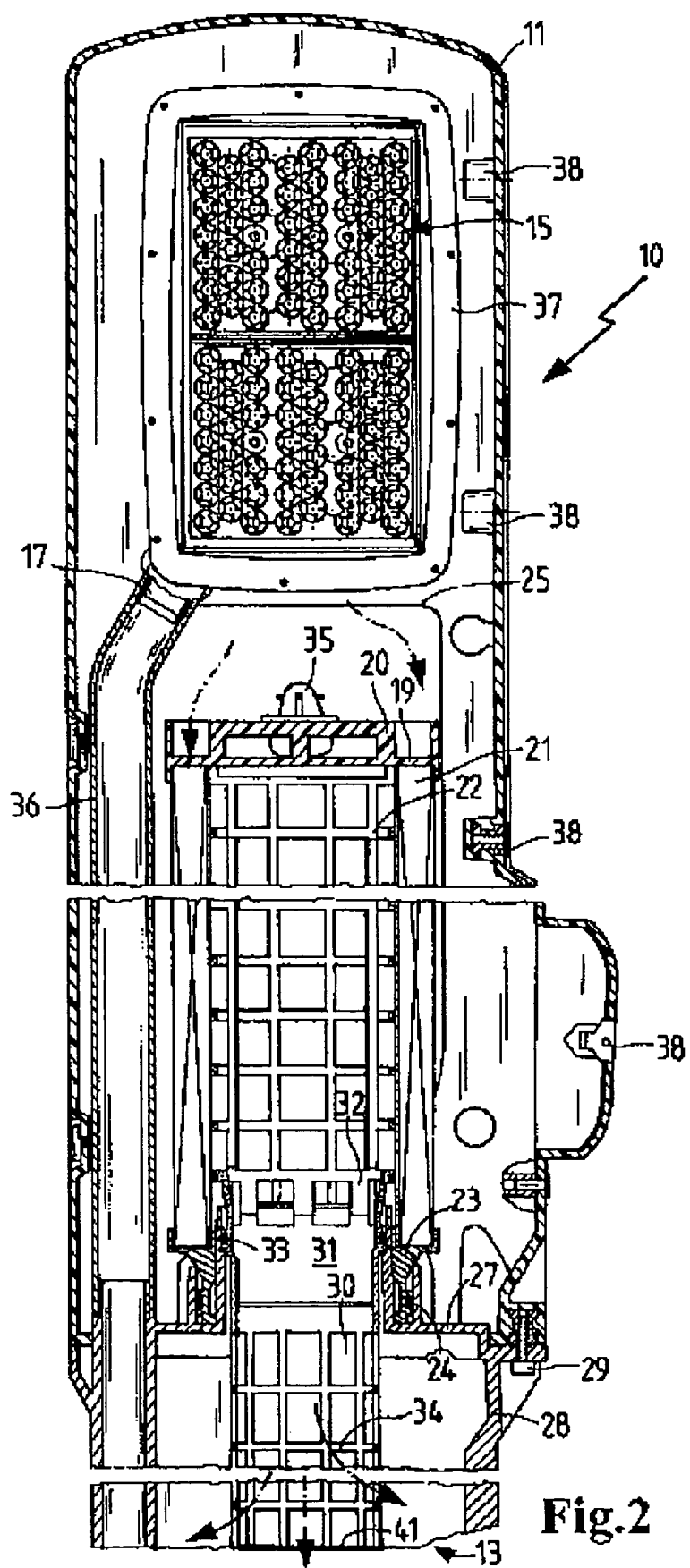
FIG. 2 is another sectional view through the air filter system of the invention.

FIG. 2 shows another sectional diagram of the filter system of the invention. Components corresponding to those shown in FIG. 1 are identified by the same reference numerals. This figure clearly shows a channel 36 for discharge of the dust and solid particles separated from the air of the cyclone section, which is connected to an external vacuum source. It can be seen that the separated dust and solid particles are completely separated from the remaining interior of the housing 11 by the channel 36. This view also shows a mounting flange 37 for attaching the inlet cover 14. The functional elements not shown here, such as lighting systems and/or mirrors, are attached at mounting points 38 which are distributed around the housing 11. The wiring for electrification and any switch units or control devices is then provided within the housing 11.

Figure 3:
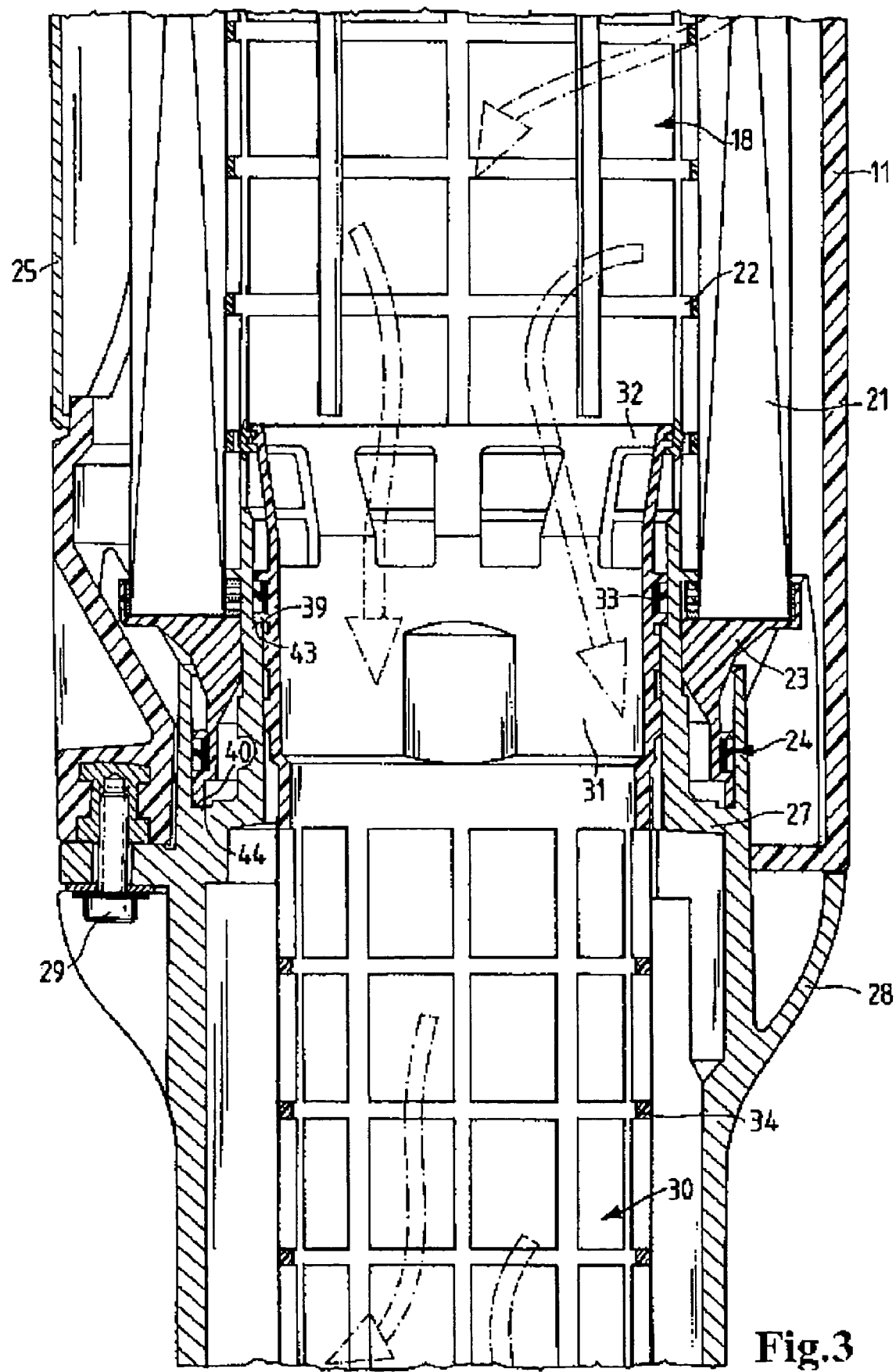
FIG. 3 is an enlarged view of the connecting site between the main filter element and the secondary filter element.

FIG. 3 shows an enlarged cross sectional view of the connection area between the main filter element 18 and the secondary filter element 30. Parts corresponding to those shown in FIGS. 1 and 2 are again identified by the same reference numerals. The enlargement clearly shows how the connection profile 27 guides and supports the main filter 18 and the secondary element 30. During assembly, the secondary element 30 is inserted first into the concentric opening in the connecting profile 27, whereby in the end area the radial gasket 33, which is integrated into the collar 32 of the secondary element 30, lies in sealing contact with an axial wall of the connecting profile 27. An axial stop edge 43 is arranged on the axial wall of the connecting profile 27. Stop edge 43 is contacted by an axial stop 39 on the secondary filter element 30 when the secondary filter element is installed, thereby defining the axial end position of the secondary filter element 30.

The main filter element 18 then is introduced into the housing 11 of the air filter 10, whereby the collar 32 of the secondary filter element 30, which is wider at its upper end, initially assists in guiding and centering the main filter 18. The main filter 18 is pushed over the collar 32, whereupon the radial gasket 24 of the end disk 23 of the main filter element 18 lies in sealing contact with another axial wall of the connecting profile 27. Here again, the connecting profile 27 has an axial stop edge 44 which ensures an axial definition of the end position in conjunction with the axial end stop 40 of the main filter element 18.

Figure 4:
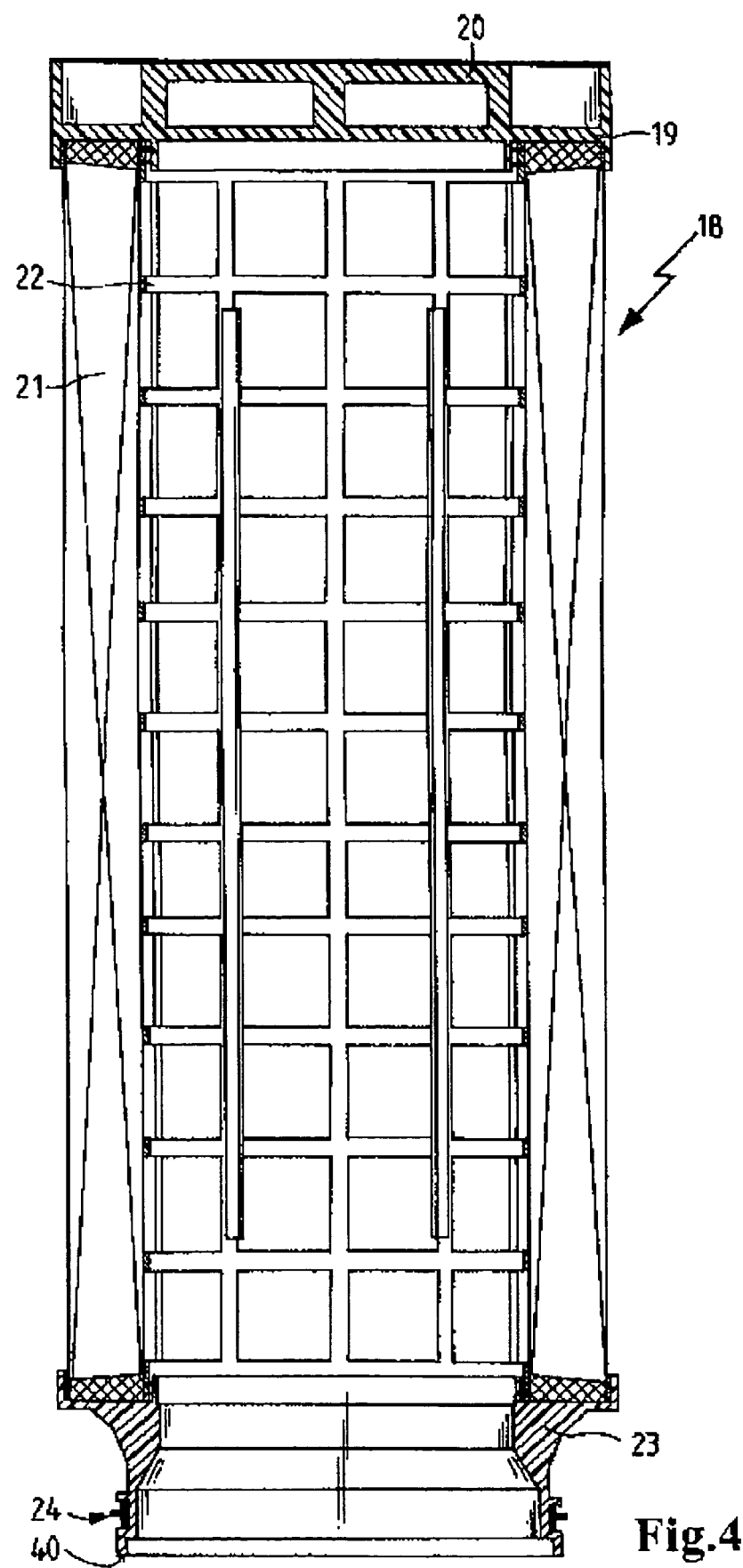
FIG. 4 is a sectional view of the main filter element.

FIG. 4 shows a sectional view of the main filter element 18. Once again, parts corresponding to those shown in the previous figures are identified by the same reference numerals. The main filter element 18 has an accordion folded or pleated filter medium 21 which is supported by an internal supporting tube 22. The end faces of the filter medium 21 are sealed off by end disks 19 and 23. The first end disk 19, which is closed, has a handle element 20 which does not protrude radially outwardly beyond the projected area of the filter element 18. The end disk 19 is integrally connected (e.g., formed in one piece) to the handle element 20 and is inseparably connected to the filter medium 21 and the supporting tube 22. This may be accomplished by welding or gluing, for example.

The second end disk 23, which has a hollow cylindrical structure, is also inseparably connected to the filter medium 21 and to the supporting tube 22. The end disk 23 has an axial end stop 40 which functions in conjunction with the connecting profile 27 to fix the axial position of the main filter element 18. In the area of the end stop 40, the end disk 23 has a peripheral groove with a gasket 24 inserted into it. The gasket has a T-shaped cross section, is manufactured in one piece of a flexible elastic synthetic resin material, and the effective area of the radial gasket is comparable in its function to a windshield wiper lip.

Figure 5:
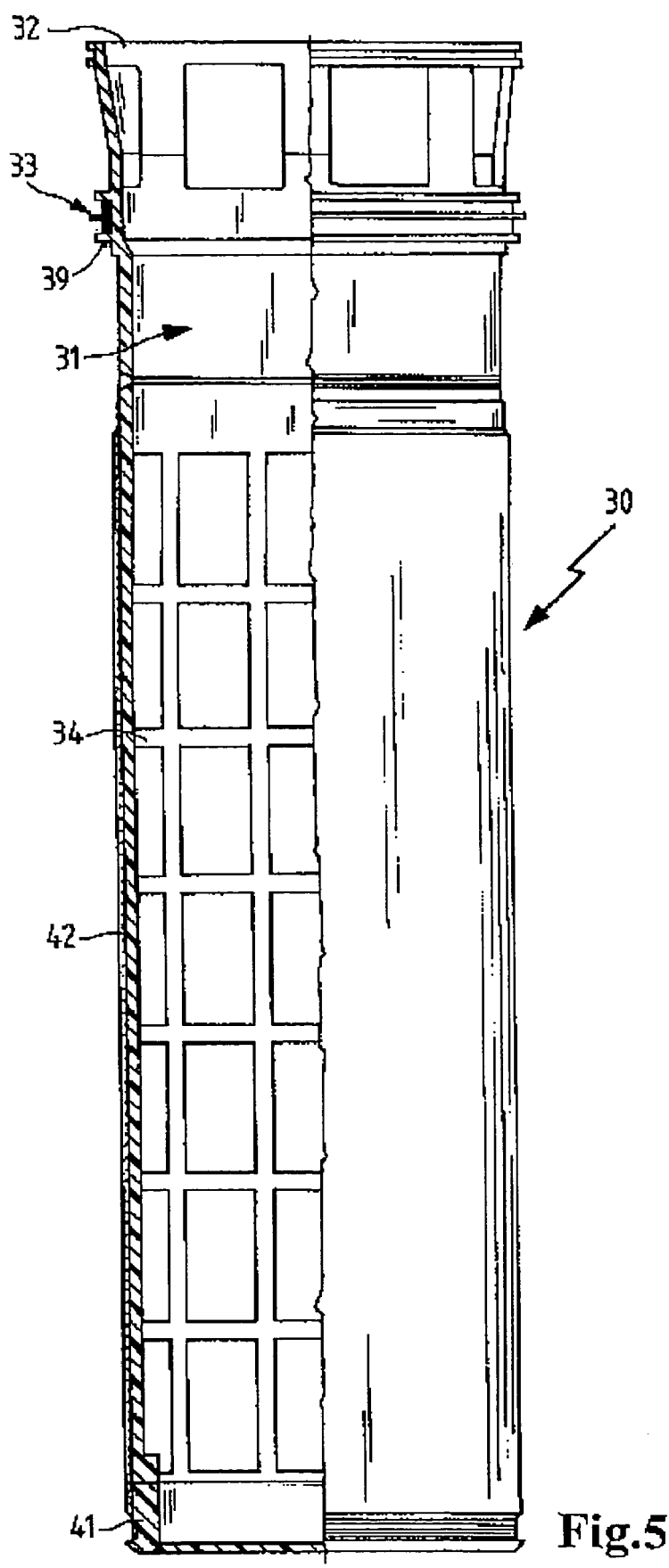
FIG. 5 shows a section through the secondary filter element.

FIG. 5 shows a sectional view of the secondary filter element 30. Again, parts corresponding to those shown in previous figures are identified by the same reference numbers. The filter medium of secondary filter element 30 comprises a nonwoven filter web 42 which is supported by an internal supporting tube 34. The lower end of the secondary filter element 30 is tightly sealed by an end disk 41. The other (upper) end face of the secondary filter element 30 carries an end disk 31 having a hollow cylindrical configuration with an upwardly extending collar 32. The collar 32 is interrupted by a plurality of passages so that it can also function as a handle. In an intermediate area of the end disk 31 there is a circumferential groove which accommodates a radial gasket 33. The radial gasket 33 has a T-shaped cross section, with the sealing effect being achieved due to a radially outwardly projecting, windshield wiper-like lip. The lower edge 39 of the peripheral groove serves as an axial stop for the secondary element upon insertion into the connecting profile 27. This edge 39 is completely in contact with the axial stop edge 43 of the connecting profile 27 when the secondary element is correctly inserted.

The metal-free main filter element and the secondary filter element, which is also metal-free, can be disposed of without difficulty. Filter paper, nonwoven web, plastic center tube and handle as well as the plastic end disks can be disposed of easily by thermal incineration. Due to the special shapes of the end disks of the two filter elements, the two filter elements can be combined together easily and installed via the connecting profile of the housing.

The foregoing description and examples have been set forth merely to illustrate the invention and are not intended to be limiting. Since modifications of the described embodiments incorporating the spirit and substance of the invention may occur to persons skilled in the art, the invention should be construed broadly to include all variations within the scope of the appended claims and equivalents thereof.

What is claimed is:

1. An air filter comprising an essentially metal-free filter insert with a filter medium which forms a hollow cylinder, and end disks arranged on the axial end faces of the filter medium of the filter insert, wherein one end disk forms a closed end of the filter element and has a handle element extending axially away from the filter element, and the other end disk is constructed as a hollow cylinder and comprises a concentric, radially-acting, resilient gasket.

2. An air filter according to claim 1, wherein said filter is an air filter for cleaning combustion air for an internal combustion engine.

3. An air filter according to claim 1, wherein the filter medium is pleated, and at least the end disk with the handle element is made of a thermoplastic synthetic resin material.

4. An air filter according to claim 1, wherein the filter insert further comprises a concentric supporting body adjacent the inside or outside of the cylindrical filter medium.

5. An air filter according to claim 1, wherein the hollow cylindrical end disk has a hollow cylindrical, concentric and axially extending collar.

6. An air filter according to claim 5, wherein said collar is connected by reinforcing ribs to the end disk.

7. An air filter according to claim 5, wherein the hollow cylindrical collar has an outer circumferential groove in which a gasket having a radially outwardly protruding lip is arranged.

8. An air filter according to claim 1, wherein the filter insert is sealingly connectable via the radial gasket to a connecting profile in the form of a circular ring, the axial end of the collar being bounded axially by a stop through the connecting profile, and a secondary filter element being sealingly connectable to the filter insert via the connecting profile.

* * * * *